Jan. 9, 1934.    W. C. ERWIN    1,943,009
RECIPROCATING MOTOR
Filed Nov. 19, 1930
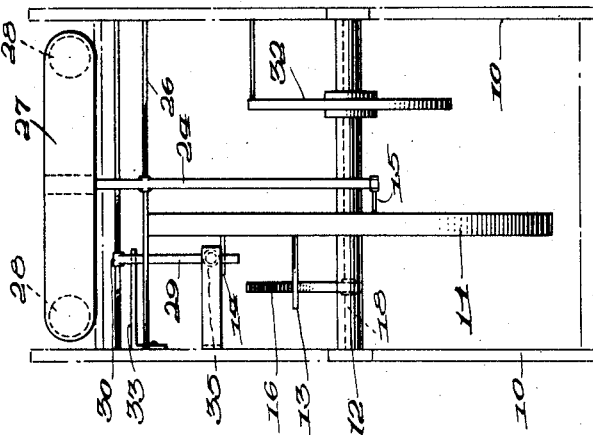
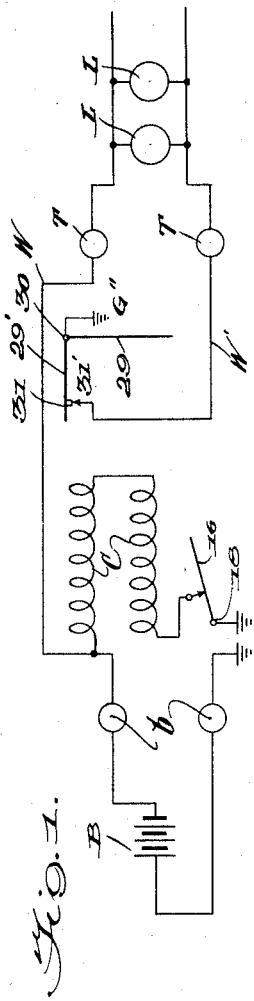
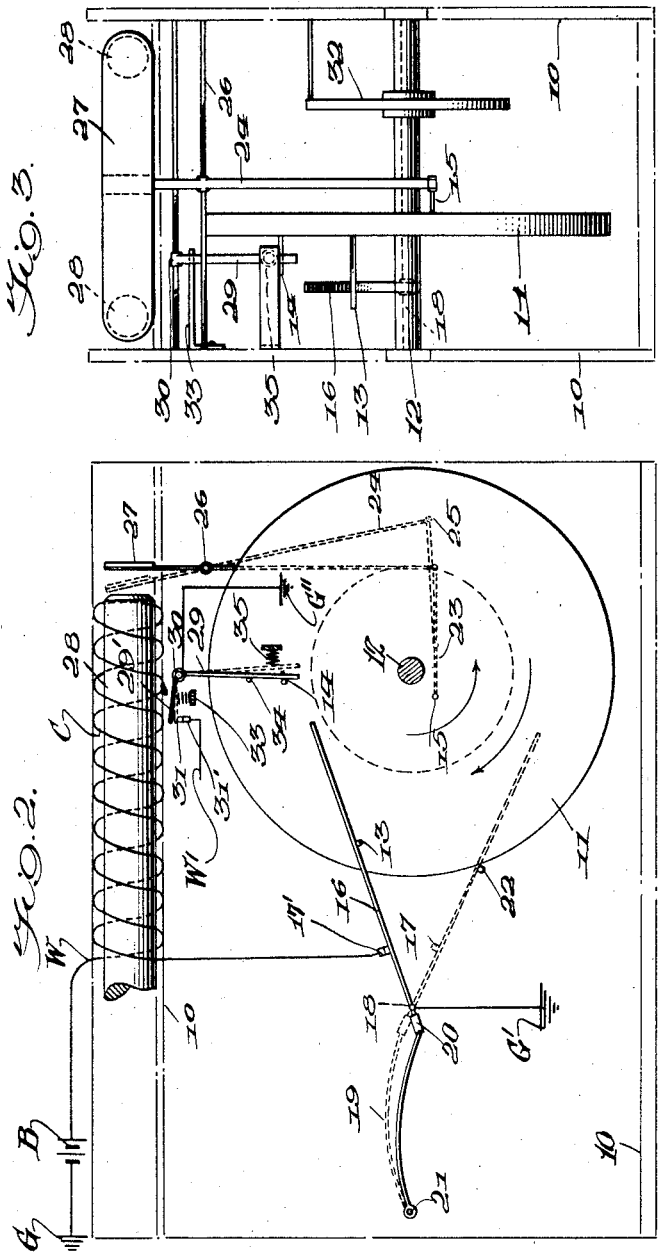
Inventor
William C. Erwin,
By Munson H. Lane
Attorney Patented Jan. 9, 1934

1,943,009

UNITED STATES PATENT OFFICE 1,943,009

RECIPROCATING MOTOR

William C. Erwin, Winthrop, Mass.

Application November 19, 1930
Serial No. 496,738

6 Claims. (Cl. 172—126)

The invention relates to improvements in circuit controllers, and more particularly to an interrupter particularly designed for flashing signal lights, signs or the like, though the principles of the invention are applicable for use also with electric clocks, or other devices in which a periodic circuit interruption is required.

The object of the invention is to produce a simple, inexpensive circuit interrupter, which is certain in its operation and which in use consumes a minimum amount of electric current.

The invention will be more readily understood by reference to the accompanying drawing in which is shown an illustrative embodiment of the invention.

In the drawing:

Fig. 1 is a wiring diagram showing a circuit in which the invention is employed for periodically flashing lamps;

Fig. 2 is a side elevation, diagrammatic in character, showing the cooperating elements of the circuit interrupter mechanism, and Fig. 3 is a similar view in end elevation.

The showing in Figs. 2 and 3 is largely diagrammatic in character, the framework being indicated only fragmentarily, as the present invention does not relate to specific details of such framework.

In the drawing, the numeral 10 denotes generally parts of the framework within which is mounted a suitable balance wheel 11 journalled within the sides of the frame on a shaft 12, which may be provided with jewelled bearings in order to eliminate friction. Projecting from the balance wheel are pins 13 and 14 extending from one side and a crank pin 15 extending from the other side. The numeral 16 denotes a balanced lever of steel wire or other suitable material, which is provided with a contact 17 adapted to engage a fixed contact 17' to complete an electro-magnetic circuit, diagrammatically illustrated in Fig. 1. The lever 16 is pivoted at 18, this pivot being preferably grounded.

The numeral 21 denotes a shaft, free to rotate, and journalled by means of anti-friction bearings in the sides of the framework. This shaft is on substantially the same level as the balance wheel shaft 12 and the pivot pin 18 of the lever 16, and is consequently hidden by the shaft 12 in the end view (Fig. 3). To the shaft 21 is fastened one end of a small leaf spring 19, the other end of which rests in a notch 20 at the enlarged end of lever 16. The spring 19 is constantly bowed and consequently the pivoted lever 16 is at rest only when it is in engagement either with contact 17' or with a stop 22 which is provided for the purpose of limiting the angular movement of the lever 16 in a downward direction.

To cause oscillation of the balance wheel 11 in one direction suitable electro-magnetically operated means are provided. As shown, a link 23 connects crank pin 15 to an armature lever 24 to which it is attached by means of a pin 25. The armature lever 24 is pivoted intermediate its ends as at 26, and carries at its upper end the armature 27 of an electro-magnet, the core 28 and coils C of which are indicated in Figs. 2 and 3, the coils C only being illustrated diagrammatically in Fig. 1.

For providing oscillation of the balance wheel in the opposite direction from that produced by the electro-magnet, a hair spring 32, mounted upon shaft 12, or other suitable means, is employed.

The parts so far described are designed to effect a periodic oscillation of the balance wheel, the electro-magnet 28 being periodically energized and de-energized by the swinging movement of the lever 16, the coil spring 32 serving to produce reverse rotation of the wheel when the electro-magnet is de-energized.

This periodic oscillation of the balance wheel may be suitably employed for making and breaking an electrical circuit for periodically flashing an electric signal, or for any other desired purpose. As shown, the mechanism for accomplishing this purpose comprises a right angle member pivoted as at 30 and provided with a downwardly extending arm 29, preferably of thin steel wire, and a laterally extending arm 29', which serves as the circuit making and breaking member. The pivot pin 30 may be grounded as indicated in Fig. 1, while the arm 29' carries a contact 31 which is adapted to engage a fixed contact 31' for completing a circuit through a series of lamps or other objects LL indicated in Fig. 1. The arm 29' is normally held away from the contact 31' by means of a spring 33 or other suitable means, the lower arm 29 engaging a fixed stop 34 when the contacts 31, 31' are separated. The contacts are closed by the engagement of the pin 14 mounted on balance wheel 11. A weak spring stop 35 is provided to insure substantially constant duration of engagement between the contacts 31, 31', regardless of whether the battery or other source of current B (Fig. 1) is weak or strong.

The wiring diagram shown in Fig. 1 has been incidentally referred to in connection with the description of the apparatus shown in Figs. 2 and 3, and is intended to illustrate a satisfactory electrical circuit. As shown, the source of current is indicated at B, the battery terminals at b—b, one of which may be grounded at G. The electro-magnet is indicated by its coils C, and the make and break mechanism for the electro-magnetic circuit is indicated by the lever 16, pivoted at 18 and grounded at G'. As shown, the lamp circuit includes lamps LL, having terminals TT, one of which is connected by wire W to a battery terminal, while the other lamp terminal is connected through wire W', contacts 31', 31, contact arm 29', and pivot pin 30 to ground G''. Obviously the three grounds G, G', G'' may be connected by suitable wires, or other equivalent circuits may be employed, that one illustrated not being intended as in any way limiting the invention, but merely as showing a practical circuit for use with the mechanism herein disclosed.

The operation of the device as a whole will now be described. The position of levers 16 and 24 shown in full lines in Fig. 2 indicates the normal relation of parts when the mechanism is at rest, the contacts 31, 31' being held apart by spring 33, the lever 16 being held in raised position by engagement of leaf spring 19 upon the notched rear end 20, and the armature 27 being out of engagement with the electro-magnet 28. When the battery B is connected to terminals b—b, the armature 27 is drawn toward the magnet, swinging the lever 24 about its pivot 26, to the dotted line position, and causing oscillation of the balance wheel 11 in a counter-clockwise direction. This causes the pin 14 to engage the lever 16, carrying the lever half-way down, due to the momentum of the wheel, and separating contacts 17, 17'. The compression of the spring 19 itself causes the lever 16 to move the rest of the way to its lowered position against the stop 22, with a quick or snap action. The wheel 11 in the meantime continues its oscillation until it comes to rest against the increasing torque of the coil spring 32, whereupon it starts to return to its initial position.

The pin 13, which is always on the under side of lever 16, on the return rotation of the balance wheel 11 engages beneath the lever 16 so that on the return of the wheel the lever is forced up to its position of instability, from which it snaps up to again close the driving contacts 17, 17', thereby re-energizing the electro-magnet. As the wheel returns to its initial position, the pin 14 engages the wire lever arm 29, carrying it against the spring stop 35 and causing the contacts 31, 31' to engage for a brief instant, thereby flashing the lamps. The resilience of spring stop 35 causes the pin 14 to immediately rebound so that the periodic engagement of the contacts 31, 31' is only momentary, the contacts being separated by the spring 33 as soon as the pin 14 is out of the way. The wire 29 is made very thin and of resilient material, and when engaged by the pin 14 is bowed slightly. The spring stop is so arranged as not to engage the wire 29 when in its position of rest against the stop 33, but only when the wire is deformed by the engagement of the pin 14. The spring 35 acts as a buffer or shock absorber, and its effect is to produce a substantially constant period of contact between the members 31, 31', regardless of whether the balance wheel is moving with high momentum when the battery B is fresh, or with less momentum when the battery is partially exhausted.

The balance wheel now again moves in a counter-clockwise direction under the magnetic action of the electro-magnet 28, which has been re-energized by the engagement of contacts 17, 17', and the cycle of operation is continued as long as the current is supplied from the battery, resulting in periodic flashing of the lamps LL.

The invention has been described in detail for the purpose of illustration, but it will be evident that many of the details may be varied without departing from the spirit of the invention.

Among the features of the invention which are regarded as of particular importance are the snap action of the bowed spring 19 in connection with the swinging lever 16, and the use of the light spring lever 29 in connection with the spring stop 35. The device may be used for many purposes where intermittent current interruption is desired. Either direct or alternating current may be used as the source of electrical energy. While the hair spring 32 has been described as the means employed for reversing the oscillatory movement of the balance wheel at the end of the rotation produced by the electro-magnet, it is obvious that other equivalent means may be employed, as for example, another form of spring, or a suitable weight. It is to be understood that these alternative mechanisms are intended to be included within the scope of the appended claims.

For example, while the spring 19 has been referred to as a leaf spring, it is obvious that instead of a flat spring a long thin wire might be employed, the end of which would rest in a conical depression in the end of the pivoted contact piece. Also, the hair spring 32 may be provided with a suitable tension regulating device such as is commonly used on balance wheel time pieces for the fast and slow adjustment.

What I claim is:

1. A device of the character described, comprising an oscillatory member, electro-magnetic means for rotating the oscillatory member in one direction, balancing means for producing reverse rotation after the electro-magnetic means has ceased to operate, and automatic means operated by the rotation of the oscillatory member for periodically making and breaking the electro-magnetic circuit, said means including a pivoted lever extending into the path of the oscillatory member, means carried by said oscillatory member for engaging the said lever, a contact carried by said lever adapted in one position of the lever to close the circuit through the electro-magnet, and in another position to open said circuit, and a leaf spring constantly engaging said lever and serving to snap the lever to one or another of its positions of rest after the lever has been preliminarily actuated by said oscillatory member.

2. A device of the character described, comprising an oscillatory balance wheel, electro-magnetic means for rotating the balancing wheel in one direction, balancing means for producing reverse rotation after the electro-magnetic means has ceased to operate, and automatic means operated by the rotation of the oscillatory balance wheel for periodically making and breaking the electro-magnetic circuit, said means including a pivoted lever extending into the path of the oscillatory balance wheel, means carried by said oscillatory balance wheel for engaging the said lever, a contact carried by said lever adapted in one position of the lever to close the circuit through the electro-magnet, and in another position to open said circuit, and a leaf spring constantly engaging said lever and serving to snap the lever to one or another of its positions of rest after the lever has been preliminarily actuated by said oscillatory balance wheel.

3. In combination with an oscillatory member, electro-magnetic means for actuating the member in one direction, and balancing means for producing return rotation in the opposite direction, means for automatically making and breaking the electro-magnetic circuit, including a swinging contact carrying member having stops to limit the swinging movement in each direction, means carried by said oscillatory member initiating the swinging movement in either direction, and a leaf spring engaging the swinging member for producing snap action of the swinging member against either stop after the swinging movement has been initiated.

4. In combination with an oscillatory member, electro-magnetic means for actuating the member in one direction, and balancing means for producing return rotation in the opposite direction, means for automatically making and breaking the electro-magnetic circuit, including a swinging contact carrying member having stops to limit the swinging movement in each direction, means carried by said oscillatory member initiating the swinging movement in either direction, and a leaf spring engaging the swinging member for producing snap action of the swinging member against either stop after the swinging movement has been initiated, the spring being bowed and pivoted at one end and at its opposite end engaging one end of the swinging member.

5. A machine of the class described, comprising a movable device, a double snap means for moving said device in either of two opposite directions upon initial movement in such direction, an electro-magnet for imparting the necessary initial movement in one direction, means for automatically imparting the necessary initial movement in the opposite direction after the electro-magnet is deenergized, and means for deenergizing the electro-magnet after it has imparted an initial movement to the movable element.

6. A machine of the class described, comprising a movable device, means for moving said device in opposite directions after initial movement of said device in such directions, a power device for imparting the necessary initial movement in one direction, means for automatically imparting the necessary initial movement in the opposite direction after the power is cut off, and means for cutting off the power when the power device has imparted an initial movement to the movable device, and for restoring the power when the movable device moves sufficiently in the opposite direction.

WILLIAM C. ERWIN.